United States Patent [19]

Vicari et al.

[11] Patent Number: 5,362,843
[45] Date of Patent: Nov. 8, 1994

[54] PROCESS FOR PREPARING HIGHLY BRANCHED MACROMOLECULE POLYMERS

[75] Inventors: Richard Vicari; Michael P. Bodman, both of Corpus Christi, Tex.

[73] Assignee: Hoechst Celanese Corporation, Somerville, N.J.

[21] Appl. No.: 125,441

[22] Filed: Sep. 22, 1993

[51] Int. Cl.$^5$ .............................................. C08G 63/00
[52] U.S. Cl. .................................. 528/271; 528/272; 528/292; 528/298; 528/302; 528/303; 528/306; 528/308
[58] Field of Search ............... 528/271, 272, 292, 298, 528/302, 303, 306, 308

[56] References Cited

U.S. PATENT DOCUMENTS

| | | | |
|---|---|---|---|
| 5,041,516 | 8/1991 | Fréchet et al. | 528/271 |
| 5,136,014 | 8/1992 | Figuly | 528/272 |
| 5,183,862 | 2/1993 | Figuly | 525/437 |
| 5,196,502 | 3/1993 | Turner et al. | 528/272 |
| 5,225,522 | 7/1993 | Turner et al. | 528/272 |
| 5,227,467 | 7/1993 | Durette et al. | 530/321 |

*Primary Examiner*—John Kight, III
*Assistant Examiner*—P. Hampton-Hightower
*Attorney, Agent, or Firm*—James J. Mullen; Donald R. Cassady

[57] ABSTRACT

The present invention provides novel one-step processes for preparing highly branched macromolecule polymers that have highly controlled molecular architectures. The process comprise the reaction of a branching monomer such as a substituted phenyl compound having the formula:

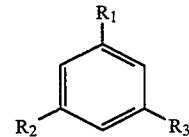

wherein $R_1$, $R_2$, and $R_3$ are defined herein, with a second monomer (a core monomer) such as a dihydric phenol for a sufficient period of time and at a sufficient temperature to directly produce the highly branched polymer, characterized by having a single core, in a single processing step.

21 Claims, No Drawings

PROCESS FOR PREPARING HIGHLY BRANCHED MACROMOLECULE POLYMERS

BACKGROUND OF THE INVENTION

1. Field of the Invention

The present invention relates to novel processes for preparing highly branched macromolecule polymers that have highly controlled molecular architectures, and which have numerous applications such as chelating agents, rheology modifiers, and drug delivery vehicles.

2. Description of Related Art

The following prior art references are disclosed in accordance with the terms of 37 CFR 1.56, 1.97, and 1.98.

*J. Chem. Soc. Perkin Trans.* 1992 (p. 2459–2469) discloses a multi-step process for preparing highly branched macromolecules with aromatic polyester inner structure and a readily modified hydrophobic/hydrophilic surface.

Macromolecules 1993, 26, p. 4617–4623 discloses the synthesis of all-aromatic hyperbranched polyesters with phenol and acetate end groups. The synthesis was based on the melt condensation of the $A_2B$ monomers 3,5(bis-trimethylsiloxy)benzoyl chloride and 3,5-diacetoxybenzoic acid.

U.S. Pat. No. 5,041,516 discloses a multi-step convergent process for preparing polyesters from aliphatic and aromatic monomers.

U.S. Pat. No. 5,136,014 discloses polyesters prepared from aromatic and aliphatic monomers without a core group and which are capped.

U.S. Pat. No. 5,183,862 discloses capped polyesters prepared from aliphatic and aromatic monomers without a core group.

U.S. Pat. No. 5,196,502 discloses the use of diacetoxybenzoic acids and monoacetoxydibenzoic acids to produce wholly aromatic polyesters. This patent does not teach the use of a core monomer to increase the number of surface end groups in the polymer.

U.S. Pat. No. 5,225,522 discloses multiply-branched aliphatic-aromatic polyesters and processes for preparing the same; however, there is no disclosure of a core group.

U.S. Pat. No. 5,227,462 discloses multiply-branched aliphatic-aromatic polyesters and processes for preparing the same; however, there is no disclosure of a core group.

SUMMARY OF THE INVENTION

The present invention provides novel processes for preparing highly branched macromolecule polymers that have highly controlled molecular architectures. These types of polymers have utility in numerous areas such as engineering resins, fiber, film, bottle resins, rheology modifiers, drug delivery systems, membranes, chelating agents, catalyst support, medical applications, analytical systems, and separation processes, in addition to being incorporated or copolymerized with other polymers such as polysulfone and polycarbonate.

The process comprises the reaction of a branching monomer ("monomer") such as a substituted phenyl compound having the formula:

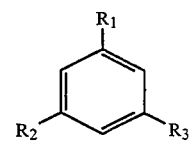

wherein $R_1$, $R_2$, and $R_3$ are defined below, with a second monomer ("core monomer"), hereinafter defined, such as a dihydric phenol for a sufficient period of time and at a sufficient temperature to produce the highly branched polymers in a single processing step.

DETAILED DESCRIPTION OF THE INVENTION

The present invention is directed to a novel process for preparing a highly branched polymer in a single step procedure and which has been unachievable in the past. The present process utilizes the reaction of a certain class of substituted phenyl compounds (referred to herein as "branching monomer" or "monomer") with a certain class of polyfunctional core molecules (herein referred to as "core monomer") at a sufficient temperature and for a sufficient period of time to produce the highly branched polymer without any waste by-products and which polymer is characterized by its high degree of branching which originates from a single, central point, (or "core"), a branch point at each monomer unit, and a large number of chain ends or "surface" functional groups, resulting in a unique controlled macromolecular architecture. The core monomer is further characterized as a monomer which contains functional groups which will only react with one of the three functional groups of the branching monomer. The desired end results are only achievable by using the herein described "core monomer" in each and every case in the condensation reaction. The use of the core monomer is thus a critical feature, without which the maximum branching could not occur.

The branching monomer (hereinafter referred to as "monomer") is a substituted phenyl compound of the formula:

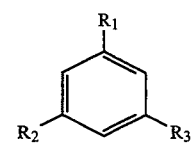

wherein
$R_1$ is from the group:
  COOH
  $C(O)-OC_6H_{35}$
  $O-CH_2CH_2OH$
  $O-C(O)-CH_3$
  $-N-CH_2CH_2OH$
$R_2$ is from the group:
  COOH
  OH
  $NH_2$
  $O-C(O)-CH_3$; and
$R_3$ is from the group:
  COOH
  OH
  $NH_2$
  $O-C(O)-CH_3$;

with the proviso that (a) when $R_1$ is —COOH, $R_2$ and $R_3$ must be the same but not equal to $R_1$, and $R_2$ and $R_3$ are either OH or O—C(O)—CH$_3$; (b) when $R_1$ is —C(O)—OC$_6$H$_5$, $R_2$ and $R_3$ are equal and are either OH or NH$_2$; and (c) when $R_1$ is O—CH$_2$CH$_2$OH, or N—CH$_2$CH$_2$OH, $R_2$ and $R_3$ are equal and $R_2$ and $R_3$ are —COOH (or —COOR$_4$ wherein $R_4$ is alkyl C$_1$–C$_4$.

Typical branching monomers falling within the above monomer formula include:

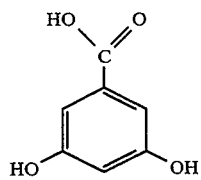

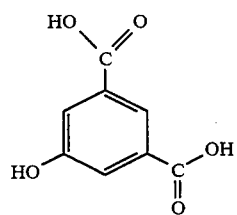

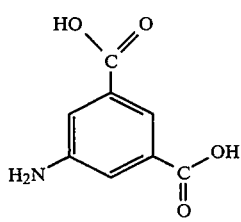

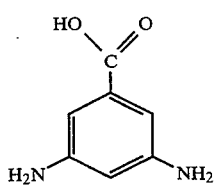

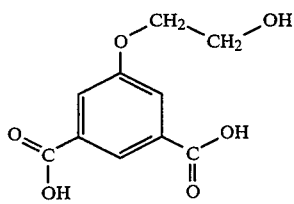

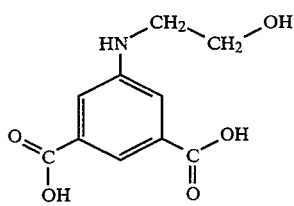

The second monomer (or core monomer) used in the present invention includes the following seven categories of compounds (i.e., I–VII):

I. dihydric phenol having the following formula:

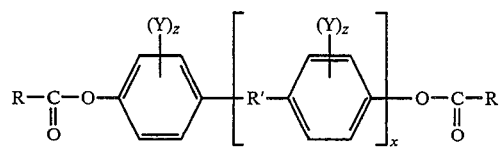

wherein R is independently selected from hydrogen, an alkyl radical having from 1 to about 6 carbon atoms, preferably methyl, cycloalkyl having from 4 to about 7 carbon atoms, or aryl, Y is independently selected from alkyl groups of 1 to 4 carbon atoms, chlorine or bromine, z independently has a value of from 0 to 4, inclusive, and R' is independently selected from a divalent saturated aliphatic hydrocarbon radical, particularly alkylene or alkylidene radicals having from 1 or 8 carbon atoms or halogenated derivatives thereof, especially C(CH$_3$)$_2$, C(CX$_3$)$_2$, wherein X is a halogen, preferably fluorine, cycloalkylene or cycloalkylidene radicals having up to and including 9 carbon atoms, halogenated derivatives thereof, O, S, SO, SO$_2$, CO; and x is 0 or 1.

The dihydric phenols that may be used in this invention include but are not limited to the following:
2,2-bis-(4-hydroxyphenyl)propane,
2,2-bis-(4-hydroxyphenyl)hexafluoropropane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-4-hydroxyphenyl)pentane,
3,3-bis-(4-hydroxyphenyl)pentane,
2,2-bis-(4-hydroxyphenyl)heptane,
1,2-bis-(4-hydroxyphenyl)-1,2-bis-(phenyl)-propane,
4,4'-(dihydroxyphenyl)ether,
4,4'-(dihydroxyphenyl)sulfide,
4,4'-(dihydroxyphenyl)sulfone,
4,4'-(dihydroxyphenyl)sulfoxide,
4,4'-(dihydroxybenzophenone),
hydroquinone, and
naphthalene diols.

These dihydric phenols may be used individually or in any combination. It is also possible to add up to 50 wt. % based on the total diol content of aliphatic diols, such as neopentyl glycol. One common dihydric phenol is 2,2-bis(4-hydroxyphenyl)propane (bisphenol-A).

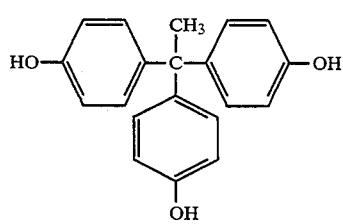

II.

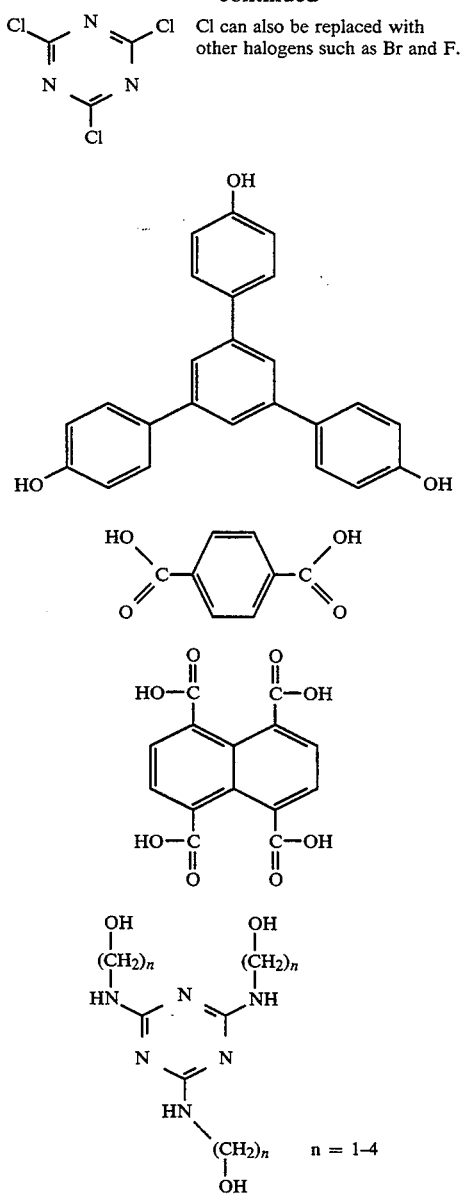

The reaction of the branching monomer with the core monomer may be carried out in the presence of an inert diluent which has a boiling point of from about 200° C. to about 350° C., preferably from about 220° C. to about 300° C.

Suitable diluents which assist in achieving the objects of the present invention include, without limitation, diphenyl ether, halogenated diphenyl ether, diphenyl sulfone, benzophenone, polyphenyl ethers such as tri and tetraphenyl ether, terphenyl, tetraphenyl, halogenated biphenyl, and the like.

These and other suitable diluents are disclosed in U.S. Pat. No. 3,948,856 and Ing. Eng. Chem. Prod. Res. Dev., Vol. 20, No. 2, 1981; both of these are incorporated herein by reference in their entirety.

Other suitable diluents include a poly (fluorinated alkylene oxide) having repeating units as follows:

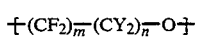

wherein m is an integer from 1 to 10, n is an integer from 0 to 5, Y is the same or different and represents hydrogen or halogen including F, Cl or Br. The poly(fluorinated alkylene oxide) can be either a straight or branched chain structure.

It is preferred that the polyether diluent be perfluorinated. Examples of the useful aliphatic polyethers used in the present invention include poly(tetrafluoroethylene oxide), poly(hexafluoropropylene oxide), poly(fluorinated butylene oxide), copolymers formed from different fluorinated alkylene oxides, etc. The polyethers used in the present invention are a non-solvent for the highly branched polymer which is formed and further, will separate from the acetic acid by-product to form a separate layer therefrom. Thus, removal of the diluent can be achieved by decantation of the diluent layer which then can be recycled to the polymerization stage. The polyether diluents used in this invention are non-flammable and non-toxic.

The poly(fluorinated alkylene oxides) used in the present invention are of relatively low molecular weight. Thus, molecular weights ($M_n$) of about 600 to 20,000 are typical with molecular weights of about 600 to 5,000 being more typical and preferred.

The diluent used, if desired, in the present invention should be present in amounts of from about 10 to about 60 wt. % based on the weight of the total charge. Preferred amounts of the diluent range from about 10 to about 40 wt. % and most preferably from about 10 to 30 wt. % based on total charge.

The amount of the diluent can vary during the polymerization reaction. For example, it may be advantageous to increase progressively the amount of the diluent to maintain the reaction medium at about constant viscosity.

It is also within the scope of the present invention to employ a reaction catalyst or a mixture of reaction catalysts. The overall objective is to use catalysts to accelerate the rate of polymerization of the reaction mixture. These catalysts are sometimes called esterification catalysts.

All the conventional catalysts being capable of accelerating an ester exchange reaction are usable. Suitable examples of catalysts are salts or compounds of elements selected from Groups 1A, 2A, 2B, 3A, 4A, and 5A of the periodic table of elements. Examples include metal oxides (e.g., magnesium oxide, lead oxide, zinc oxide, antimony trioxide); alkoxides which are prepared by the reaction of an alcohol or glycol and an alkali metal, alkaline earth metal, aluminum or titanium; sodium acetate and sodium benzoate; metal hydrides and metal borohydrodes (e.g., lithium hydride, potassium borohydride ($K_2B_2H_6$). One preferred catalyst is an alkali metal salt and most preferred are lithium and potassium salts including the acetates, carbonates, benzoates, formates, bicarbonates, hydroxides, phosphates, and monohydrogen phosphates of lithium or potassium. The lithium salts are especially preferred including lithium acetate, carbonate, and hydroxide. The catalyst is added in amounts between about 5 to 100 ppm based on core monomer, preferably about 20 to 50 ppm, and most preferably about 25 ppm.

Additional catalysts may also be used, in combination with the above described catalysts. Examples include the imidazole catalysts disclosed in U.S. Pat. No. 4,612,360 incorporated herein by reference in its entirety. Specific examples include 1-methylimidazole, 1-ethylimidazole, 2-ethyl-4-methylimidazole, and benzimidazole.

A cobalt salt may be added to the reaction medium along with the catalyst, to act as co-catalyst and as well to yield a highly branched polymer of suitable color, in particular, improved Hunter b color in which the yellowness of the highly branched polymer is substantially reduced. Cobalt has a catalytic effect in the overall process and can reduce the yellow color in the "as-prepared" highly branched polymer formed by the present process. Any cobalt salt may be used as the co-catalyst to improve highly branched polymer color, including but not limited to, cobalt acetate, cobalt benzoate, cobalt carbonate, cobalt phenate, and the cobalt salt of aliphatic or isoaliphatic carboxylic acids which contain 3 to 20 carbon atoms, such as cobalt 2-ethylhexanoate. The cobalt salt can be added directly to the monomeric components or, more preferably, to insure solubility and uniform dispersion of the cobalt salt, the cobalt salt can be dissolved in the said diluent prior to addition. In regeneral, the cobalt salt should be added in sufficient amounts to yield at least about 20 ppm, preferably at least 25 ppm of cobalt in the final highly branched polymer. Below these levels, some color improvement has been found although water white color is not achieved. More preferably, the amount of cobalt should range from about 30 ppm to 60 ppm based on the final polymer. The preferred highly branched polymer color has a value of less than 2.0 on the Hunter b scale.

The process of this invention is carried out at a polymerization temperature of at least 125° C., preferably from about 125° C. to about 275° C., and more preferably, from about 150° C. to about 250° C. The present process, where one so desires, may be conducted in an inert atmosphere (such as argon or nitrogen). It is desirable to maintain the reaction temperature as low as possible to prevent the coloration of polymer while as high a reaction temperature as possible is preferred in terms of the rate of reaction. The process is initially carded out at atmospheric pressure or super atmospheric pressure and the pressure can be reduced as polymerization proceeds. Near the end of polymerization, pressure as low as 0.1 mm Hg absolute may be used.

The polymerization reaction is conducted for a period of time sufficient to produce a highly branched polymer and which time is generally in the range of from about ½ hour to about 8 hours, depending on the particular highly branched polymer being prepared.

The polymerization reaction of this invention may be carried out batchwise or continuously by using appropriate staging and by using suitable apparatus. Moreover, the reactants may be added to the polymerization zone in any way or order desired.

The ester derivatives of the core monomer such as a dihydric phenol and the branching monomer may be formed in situ by adding the monomer together with the acid anhydride, said diluent, and the reaction catalyst to the reactor and the reaction carried out in a single reaction zone under combined esterification and polymerization conditions as described above. Additionally, the ester derivative of the core monomer such as a dihydric phenol and the branching monomer may be first prepared and then a diluent and reaction catalyst added directly to the same reaction vessel with the polymerization being carried out under the conditions described above.

The highly branched polymer having the desired characteristics is recovered in its final form by methods well known to those in the art, such as by direct devolatilization in an extruder under conditions sufficient to remove the by-product compound, coagulation, spray drying, and the like.

The highly branched polymers may be prepared in the presence of materials such as molecular weight regulators, antioxidants, and the like. The highly branched polymers obtained by the process of this invention may be used together with the well-known additives such as plasticizers, pigments, lubricating agents, mold release agents, stabilizers, inorganic fillers, and the like. These highly branched polymers may also be blended with other polymers.

Reactants useful in the methods of the present invention can be produced using procedures exemplified by the following preparations.

Preparation of 3,5-Diacetoxybenzoic Acid:

3,5-Dihydroxybenzoic acid (40 g, 0.26 mol) was refluxed with a 3-fold excess of acetic anhydride in a 250 mL round bottom flask for 2½ hours. The resulting acetic acid and excess acetic anhydride were removed under reduced pressure to yield a white solid. Recrystallization from acetic acid yielded 61.3 g (98%) of a white solid, MP=158°-1.60° C. NMR (1H, D6-acetone)—7.67, 7.66 (t,2H), 7.23 (t, 1H), 2.27 (s,6H) (13C, d6-acetone)—1.69.91, 166.31, 152.49, 133.52, 121.44, 121.27, 20.84.

Preparation of 1,1,1-Tris(4-Acetoxyphenyl)Ethane (THPE-Triacetate):

1,1,1-Tris(4-hydroxyphenyl)ethane was acetylated with acetic anhydride as in the example above. A white solid was obtained in 97% yield, MP=169° C. NMR (1H, d-6 acetone)—7.06(q), 2.28(s), 2.24(s), 13C NMR (d-6 acetone)—169.65, 149, 146.19, 129.75, 120.98, 51.45, 30.61, 20.91.

Preparation of 5-Acetoxyisophthalic Acid:

5-Hydroxyisophthalic acid was acetylated as above to yield 91% 5-acetoxyisophthalic acid as a white solid, MP=240° C.

Preparation of 3,5-Diacetamidobenzoic Acid:

3,5-Diaminobenzoic acid (15.02 g, 0.99 mol) was charged into a 250 mL round bottom flask with a condenser. Acetic anhydride (45.97 g, 0.451 mol) was added to the flask and the temperature raised to 120° C. The temperature was maintained at 120° C. for 1½ hours and allowed to cool to room temperature (about 20° C.). The white solid was isolated by filtration and dried on the filter. Yield 24.75 g (64%). 1H NMR (d6-DMSO)—10.12, 8.12, 7.89, 2.03. 13C NMR (d6-DMSO)—166.95, 167.44, 139.97, 131.66, 114.84, 113.67, 24.04.

Preparation of 5-Acetoamidoisophthalic Acid:

5-Aminoisophthalic acid (30.33 g, 0.167 mol) was charged into a 250 mL round bottom flask with acetic anhydride (56.24 g, 0.551 mol) and KOAc (0.88 g). The reaction temperature was 60°-110° C. for 45 minutes. The resulting white solid was filtered after the reaction was allowed to cool to room temperature (about 20° C.). Yield 31.98 g (86%). 1H NMR (d-6 DMSO-)—10.30, 8.41, 8.14, 2.06. 13C NMR (d-6 DMSO-)—69.17, 166.82, 140.16, 131.92, 124,61, 123.59, 24.05.

The following examples are for the purpose of illustrating the invention and should not be construed so as to unduly restrict the invention to the specific embodiments shown.

EXAMPLE 1

Polymerization of 3,5-Diacetoxybenzoic Acid with 1,1,1-Tris(4-Acetoxyphenyl)Ethane (THPE-Triacetate) as Monomer core in Dowtherm A 3,5-Diacetoxybenzoic acid (9.67 g, 41 mmol), 1,1,1-tris(4-acetoxyphenyl)ethane (1 g, 2 mmol), Dowtherm A (100 g) and KOAc (0.01 g) were placed into a 3-neck round bottom flask fitted with a thermowell, mechanical stirrer, and distillation head. The Dowtherm A was used to help reduce the melt viscosity. The polymerization was conducted at 260° C. for 2 hours. A brown solid was isolated by precipitating the dendrimer into MeOH. The brown solid was filtered and dried under vacuum. 13C NMR (CDCl$_3$)—168.93, 163.55, 162.67, 157.38, 151.22, 148.95, 146.48, 146.09, 131.66, 130.94, 130.76, 129.74, 128.77, 123.23, 121.30, 120.93, 116.88, 115.26, 51.59, 30.5, 20.84. The peaks at 166 and 115 in the 13C NMR indicate partial hydrolysis of the acetate end-groups. 13C NMR 164.36, 159.03, 152.72, 151.11, 134.32, 132.14, 130.44, 129.90, 129.79, 129.24, 126.35, 122.27, 115.10, 115.04, 114.73.

EXAMPLE 2

Polymerization of 3,5-Diacetoxybenzoic Acid with 1,1,1-Tris(4-Acetoxyphenyl)Ethane as Monomer Core 1,1,1-Tris(4-acetoxyphenyl)ethane (1.1 g), 3,5-diacetoxybenzoic acid (10.48 g, 43.7 mmol) and KOAc (0.01 g), were placed into a 3-neck round bottom flask fitted with a thermowell, mechanical stirrer, and distillation head. The temperature of the flask was ramped to 230° C. and maintained there for 45 minutes. Acetic acid began to distill off at 165° C. The melt began to become viscous and turn brownish after most of the acetic acid had distilled overhead. The temperature was then raised to 270° C. in an attempt to decrease the melt viscosity and help liberate more acetic acid. Bubble formation was observed, but no more acetic acid came overhead. Total reaction time was 1 hour and 20 minutes. The resulting dark brown solid was dissolved in CH$_2$Cl$_2$ and precipitated into methanol. The brown solid was filtered and dried under vacuum. 13C NMR (CDCl$_3$)—168.86, 163.55, 162.67, 151.36, 148.96, 146.48, 130.95, 130.78, 129.85, 129.71, 121.31, 120.93, 51.60, 30.50, 20.88.

EXAMPLES 3-16

Table I sets forth a series of examples 3-16 designed to determine the effects of temperature, time, catalyst, and vacuum on the highly branched polymerizations of 3,5-diacetoxybenzoic acid with 1,1,1-tris(4-acetoxyphenyl)ethane as the core monomer. The results showed that time and temperature were of intermediate importance, while vacuum and catalyst type were the most important predictors for molecular weight.

TABLE 1

| Example No. | Temp. °C. | Catalyst | Conc. | Vacuum | Time | MW |
|---|---|---|---|---|---|---|
| 3 | 220 | K | 0.3 | No | 1.5 | 128.73 |
| 4 | 200 | K | 0.1 | No | 2 | 6741 |
| 5 | 240 | K | 0.1 | Yes | 1 | 31894 |
| 6 | 200 | Li | 0.1 | Yes | 2 | 30804 |
| 7 | 2290 | K | 0.3 | No | 1.5 | 12126 |
| 8 | 240 | Li | 0.1 | No | 1 | 21975 |
| 9 | 200 | K | 0.5 | No | 1 | 10038 |
| 10 | 200 | Li | 0.5 | Yes | 1 | 47142 |
| 11 | 240 | Li | 0.5 | No | 2 | 17166 |
| 12 | 220 | K | 0.3 | No | 1.5 | 9125 |
| 13 | 220 | Li | 0.5 | Yes | 1.5 | 31286 |
| 14 | 220 | Li | 0.5 | No | 1.5 | 14143 |
| 15 | 220 | Li | 0.1 | No | 1.5 | 13911 |
| 16 | 220 | K | 0.3 | No | 1.5 | 3091 |

The objective of these examples 3-16 was to maximize the molecular weight (MW) of a polymer using 3,5-diacetylbenzoic acid as the functional monomer and 1,1,1-tris(4-acetoxyphenyl)ethane as the core monomer. The maximum MW that can be obtained is 67,000. The maximum MW obtained before the design was ~12,000. A $2^{5-2}$ Resolution III fractional factorial design was developed where the centerpoint run was repeated three (3) times (examples 3-12). Four (4) additional runs were analyzed together with the design runs. The following factors were evaluated: reaction temperature (220°-240° C.), catalyst type (K, Li), catalyst concentration (0.1 to 0.5%), vacuum (No, Yes), and reaction time (1-2 hours). The response that was measured was the MW of the polymer.

The most important predictors for MW were catalyst type (Li) and vacuum (Yes). Reaction temperature and time were of intermediate importance. Catalyst concentration had no effect on MW. The model for MW accounted for 90% of the variation.

EXAMPLES 17-18

These examples are set forth herein to demonstrate the theoretical molecular weight (MW) of the highly branched polymer produced from the condensation of (a) core monomer, 1,1,1-tris(hydroxyphenyl)ethane acetate (THPE-triacetate), and the branching monomer, 3,5-diacetoxybenzoic acid (Example 17) and (b) the core monomer, THPE-triacetate), and the branching monomer, 5-acetoxyisophthalic acid, (Example 18), both of which can be prepared according to the processes set forth in Examples 1 and 2 above. Table 2 represents the calculated data from Example 17 and Table 3 represents the calculated data from Example 18. It is to be noted that there is only one core in each polymer formed but several branching units which is represented by N. The calculated MW is set forth on the last column in the right hand side of each table.

TABLE 2

| N= | No. Core | G. Core | MMOL Core | No. Monomers | G. Monomer | MMOL Monomer | Calc. MW |
|---|---|---|---|---|---|---|---|
| 2 | 1 | 1 | 1.03 | 6 | 1.47 | 6.18 | 2,036 |
| 3 | 1 | 1 | 1.03 | 18 | 4.41 | 18.54 | 4,174 |
| 4 | 1 | 1 | 1.03 | 42 | 10.30 | 43.26 | 8,449 |
| 5 | 1 | 1 | 1.03 | 90 | 22.06 | 92.70 | 17,000 |
| 6 | 1 | 1 | 1.03 | 186 | 45.60 | 191.58 | 39,868 |
| 7 | 1 | 1 | 1.03 | 378 | 92.67 | 389.34 | 68,308 |
| 8 | 1 | 1 | 1.03 | 762 | 186.95 | 784.86 | 136,717 |
| 9 | 1 | 1 | 1.03 | 1530 | 375.37 | 1,575.90 | 273,536 |
| 10 | 1 | 1 | 1.03 | 3,066 | 752.22 | 3,157.98 | 547,175 |

TABLE 3

| N= | No. Core | G. Core | MMOL Core | No. Monomers | G. Monomer | MMOL Monomer | Calc. MW |
|---|---|---|---|---|---|---|---|
| 2 | 1 | 1 | 1.03 | 6 | 1.39 | 6.18 | 1,951 |
| 3 | 1 | 1 | 1.03 | 18 | 4.16 | 18.54 | 3,921 |
| 4 | 1 | 1 | 1.03 | 42 | 9.70 | 43.26 | 7,860 |
| 5 | 1 | 1 | 1.03 | 90 | 20.78 | 92.70 | 15,738 |
| 6 | 1 | 1 | 1.03 | 186 | 42.95 | 191.58 | 31,493 |
| 7 | 1 | 1 | 1.03 | 378 | 87.28 | 389.34 | 63,004 |
| 8 | 1 | 1 | 1.03 | 762 | 175.94 | 784.86 | 126,026 |
| 9 | 1 | 1 | 1.03 | 1,530 | 353.27 | 1,575.90 | 252,070 |
| 10 | 1 | 1 | 1.03 | 3,066 | 707.92 | 3,157.98 | 504,159 |

EXAMPLE 19

In order to demonstrate the chelating utility of this highly branched polymer, ten (10) grams of the polymer was produced according to the process described in Example 1. A 1% solution of copper sulfate (1000 ppm $CuSO_4$) was combined with 100 ml of water to produce a light blue solution containing copper ions. The ten (10) grams of polymer product was added, with stirring, to this solution. The resultant material was filtered to remove the copolymer-copper complex and the filtrate, which was clear and colorless, was tested for copper sulfate content. The filtrate analyzed less than ten (10) ppm $CuSO_4$.

While the invention is described with respect to specific embodiments. modifications thereof can be made by one skilled in the art without departing from the spirit of the invention. The details of said embodiments are not to be construed a limitation, except to the extent indicated in the following claims.

What is claimed is:

1. A process for preparing a highly branched macromolecule polymer comprising the step of reacting a branching monomer, having functional groups thereon, having the formula:

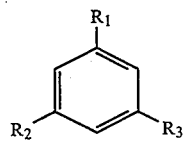

wherein
$R_1$ is independently selected from the group consisting of:
COOH
$C(O)$—$OC_6H_5$
O—$CH_2CH_2OH$
O—C(O)—$CH_3$ and
N—$CH_2CH_2OH$ $R_2$ and $R_3$ are each independently selected from the group consisting of:
COOH
OH
$NH_2$ and
O—C(O)—$CH_3$;

with the proviso that (a) when $R_1$ is —COOH, $R_2$ and $R_3$ must be the same but not equal to $R_1$, and $R_2$ and $R_3$ are either OH or O—C(O)—$CH_3$, and (b) when $R_1$ is —C(O)—$OC_6H_5$, $R_2$ and $R_3$ are equal and are either OH or $NH_2$; and (c) when $R_1$ is O—$CH_2CH_2OH$, $R_2$ and $R_3$ are equal, and $R_2$ and $R_3$ are COOH; with a core monomer, having functional groups thereon, selected from the group consisting of:

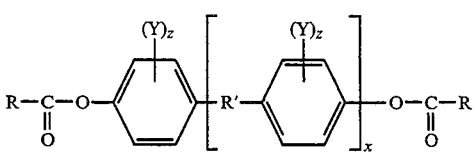

I.

wherein R is independently selected from the group consisting of hydrogen, an alkyl radical having from one (1) to six (6) carbon atoms, cycloalkyl having from four (4) to seven (7) carbon atoms, and aryl; Y is independently selected from the group consisting of alkyl group of one (1) a four (4) carbon atoms, chlorine, and bromine; z independently has a value of zero (0) to four (4), inclusive; $R_1$ is independently selected from the group consisting of one (1) to eight (8) carbon atoms and halogenated derivatives thereof, cycloalkylene or cycloalkylidine radicals having up to and including nine (9) carbon atoms and halogenated derivatives thereof, O, S, $SO_2$, and CO; and x is 0 or 1;

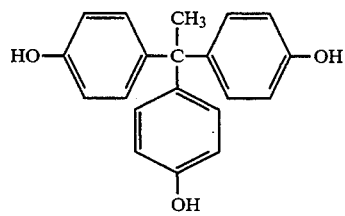

II.

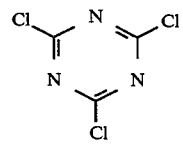

III.

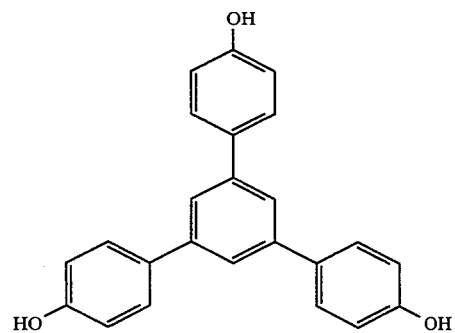

IV.

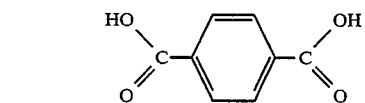

V.

VI. 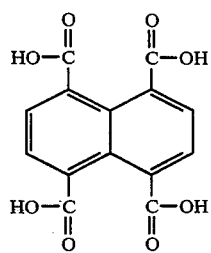

and

VII. 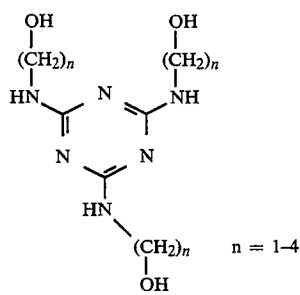

at a sufficient temperature and for a sufficient period of time to produce said highly branched polymer, with the proviso that the core monomer contains functional groups which will only react with one of the three functional groups of the branching monomer.

2. The process as set forth in claim 1 wherein the temperature is at least 125° C.

3. The process as set forth in claim 1 wherein the temperature is from about 125° C. to about 275° C.

4. The process as set forth in claim 3 wherein said reaction is carried out in the presence of an inert diluent.

5. The process as set forth in claim 1 wherein the core monomer is a formula I compound.

6. The process as set forth in claim 1 wherein the core monomer is a formula II compound.

7. The process as set forth in claim 1 wherein the core monomer is a formula III compound.

8. The process as set forth in claim 1 wherein the core monomer is a formula IV compound.

9. The process as set forth in claim 1 wherein the core monomer is a formula V compound.

10. The process as set forth in claim 1 wherein the core monomer is a formula VI compound.

11. The process as set forth in claim 4 wherein there is additionally included a esterification catalyst which promotes the reaction between said monomer and said core monomer.

12. The process as set forth in claim 11 wherein the catalyst is lithium acetate.

13. A highly branched macromolecular polymer product produced by the process of claim 5.

14. A highly branched macromolecule polymer product produced by the process of claim 6.

15. A highly branched macromolecule polymer product produced by the process of claim 7.

16. A highly branched macromolecule polymer product produced by the process of claim 8.

17. A highly branched macromolecule polymer product produced by the process of claim 9.

18. A highly branched macromolecule polymer product produced by the process of claim 10.

19. The process as set forth in claim 1 wherein the core monomer is a formula VII compound.

20. A highly branched macromolecule polymer product produced by the process of claim 19.

21. A highly branched macromolecule polymer product produced by the process of claim 1.

* * * * *

UNITED STATES PATENT AND TRADEMARK OFFICE
CERTIFICATE OF CORRECTION

PATENT NO. : 5,362,843
DATED : November 8, 1994
INVENTOR(S) : Richard Vicari, et al It is certified that error appears in the above-indentified patent and that said Letters Patent is hereby corrected as shown below:

Column 12, Line 34, after "O,S" add - - -SO,- - -.

Signed and Sealed this

Eighteenth Day of July, 1995

Attest:

BRUCE LEHMAN

Attesting Officer

Commissioner of Patents and Trademarks